US011898007B2

(12) United States Patent
Kumar et al.

(10) Patent No.: US 11,898,007 B2
(45) Date of Patent: Feb. 13, 2024

(54) DOUBLE METAL CYANIDE CATALYST FOR THE PRODUCTION OF POLYETHER POLYOLS AND A PROCESS THEREOF

(71) Applicant: COUNCIL OF SCIENTIFIC & INDUSTRIAL RESEARCH, New Delhi (IN)

(72) Inventors: Umesh Kumar, Dehradun (IN); Akash Verma, Dehradun (IN); Swati, Dehradun (IN); Bhawna Sharma, Dehradun (IN); Thangaraj Senthil Kumar, Dehradun (IN); Sudip Kumar Ganguly, Dehradun (IN); Anjan Ray, Dehradun (IN)

(73) Assignee: Council of Scientific & Industrial Research, New Delhi (IN)

( * ) Notice: Subject to any disclaimer, the term of this patent is extended or adjusted under 35 U.S.C. 154(b) by 73 days.

(21) Appl. No.: 17/669,892

(22) Filed: Feb. 11, 2022

(65) Prior Publication Data
US 2022/0259374 A1 Aug. 18, 2022

(30) Foreign Application Priority Data

Feb. 12, 2021 (IN) .............................. 202111006129

(51) Int. Cl.
*C08G 65/12* (2006.01)
*C07F 15/02* (2006.01)
*C07F 15/04* (2006.01)
*C07F 15/06* (2006.01)
*C07F 1/06* (2006.01)
*C08G 65/26* (2006.01)
*C07F 3/06* (2006.01)

(52) U.S. Cl.
CPC .............. *C08G 65/12* (2013.01); *C07F 1/06* (2013.01); *C07F 3/06* (2013.01); *C07F 15/02* (2013.01); *C07F 15/04* (2013.01); *C07F 15/06* (2013.01); *C07F 15/065* (2013.01); *C08G 65/2609* (2013.01); *C08G 65/2663* (2013.01); *C08G 2650/22* (2013.01)

(58) Field of Classification Search
CPC ................ C08G 65/12; C08G 2650/22; C08G 65/2609; C08G 65/2663; C07F 15/02; C07F 15/04; C07F 15/06; C07F 1/06; C07F 3/06; C07F 15/065
See application file for complete search history.

(56) References Cited

U.S. PATENT DOCUMENTS

| | | | |
|---|---|---|---|
| 3,278,459 A | 10/1966 | Herold | |
| 3,427,256 A | 2/1969 | Milgrom | |
| 3,427,334 A | 2/1969 | Belner | |
| 3,829,505 A | 8/1974 | Herold | |
| 4,477,589 A | 10/1984 | Van der Hulst et al. | |
| 5,158,922 A | 10/1992 | Hinney et al. | |
| 5,248,833 A * | 9/1993 | Hinney .................. | C08G 65/30 560/191 |
| 5,482,908 A | 1/1996 | Le-Khac | |
| 6,391,820 B1 * | 5/2002 | Ooms ................ | C08G 65/2663 528/421 |
| 8,680,002 B2 | 3/2014 | Ahn et al. | |

FOREIGN PATENT DOCUMENTS

CN 104479124 A * 4/2015 .............. B01J 27/26
WO WO-2018158370 A1 * 9/2018 .............. B01J 27/26

* cited by examiner

*Primary Examiner* — Rabon A Sergent
(74) *Attorney, Agent, or Firm* — Norton Rose Fulbright US LLP

(57) ABSTRACT

The present invention discloses a Double Metal Cyanide (DMC) catalyst(s) useful for the production of polyether polyols (PEPO) and a less energy intensive room temperature method for the synthesis thereof. The catalyst(s) comprises of a DMC complex, an organic complexing agent, i.e., ethylenediaminetetraacetic acid (EDTA) and other co-complexing organic agents, e.g., t-BuOH, PEPO of composition ranging from about 1 to 10 wt %, wherein the average molecular weight of PEPO used ranged from 200 to 1000. A method of preparing a series of DMC catalyst(s) at room temperature with varying compositional ratios of the complexing and co-complexing agents targeting a wide range of PEPO of varying kinematic viscosity range is also disclosed. These DMC catalyst(s) are amorphous, highly active, and easily separable from product PEPO with recyclability/ recoverability, making the product PEPO better industrially applicable and DMC catalyst more cost-effective.

8 Claims, 3 Drawing Sheets

DOUBLE METAL CYANIDE CATALYST FOR THE PRODUCTION OF POLYETHER POLYOLS AND A PROCESS THEREOF

FIELD OF THE INVENTION

The present invention relates to a double metal cyanide [DMC] catalyst useful for the production of polyether polyols [PEPO]. Particularly, the present invention relates to a cost-effective, room temperature, less energy-intensive method for the synthesis of a series of highly active amorphous DMC catalysts useful for the production of PEPO by the polymerization of epoxides. More particularly, the present invention relates to an improved room temperature method for the synthesis of a series of DMC catalysts that have high activity, are amorphous with the EDTA as a complexing agent, and t-BuOH, PEPO as the co-complexing agent(s). The DMC catalysts of the present invention are especially valuable for producing PEPO of a lower degree of unsaturation, especially over a wide range of kinematic viscosity useful in the polyurethanes (PU) industry.

BACKGROUND OF THE INVENTION

DMC complexes are known to catalyze the ring-opening polymerization reactions of epoxides such as ethylene oxide (EO), propylene oxide (PO), butylene oxide (BO), isobutylene oxide (IBO), styrene oxide (SO), and other similar organic oxides. These highly active DMC catalysts produce PEPO with high molecular weight and with low unsaturation as compared to similar polyols produced by the conventional method using the KOH catalyst. DMC catalysts, apart from their use in PEPO production, are also reported to be used for making polymeric products such as polyether, polyester, polyether ester polyols, and polycarbonate polyols. These catalysts are generally prepared by reacting aqueous solutions of metal salts and metal cyanide salts to form the DMC catalyst. PEPO is useful in making PU coatings, sealants, elastomers, foams, and adhesives. Conventional DMC catalysts are usually prepared in the presence of a low molecular weight complexing agent such as t-BuOH, glyme, and ether containing ligands. Alcohols or ether groups present in the complexing agent with the DMC complex favorably impact the activity of the catalyst for epoxide polymerization (U.S. Pat. Nos. 3,427,256A, 3,829,505A, and 5,158,922A). The conventional method uses the aqueous solution of zinc chloride (excess) and potassium hexacyanocobaltate followed by the addition of the organic complexing agent such as glyme to produce the DMC catalyst represented by the formula: $Zn_3[Co(CN)_6]_2 \cdot xZnCl_2 \cdot yH_2O \cdot zGlyme$.

A low molecular weight organic complexing agent, typically an ether or alcohol, is preferable to enhance the activity of the DMC catalyst. The molecular weight of such an organic complexing agent may range from 50 to 500. Other reported complexing agents include alcohols, ketones, esters, amides, urea, and similar compounds. (See, for example, U.S. Pat. Nos. 3,427,256A, 3,427,334A, and 3,278,459A). Generally, the catalysts have relatively high surface areas, typically within the range of about 20-200 $m^2/g$. t-BuOH is the preferred complexing agent used in the DMC catalyst. The molecular weight of such an organic complexing agent may range from 50 to 500. Examples can be seen in U.S. Pat. No. 4,477,589A (column 3), U.S. Pat. No. 3,829,505A (column 12), and U.S. Pat. No. 5,158,922A (column 6). The other co-complexing agents, such as PEPO, have also been used in producing the DMC complex to increase the activity of the catalyst (U.S. Pat. No. 8,680,002B2, U.S. Pat. No. 5,482,908A).

Other polyols can also be used as a co-complexing agent in producing the DMC catalyst, but PEPO produced by the DMC catalyzed reaction are preferred for use as a co-complexing agent. Catalysts produced with polyols as a co-complexing agent are amorphous, confirmed by X-ray diffraction (XRD) analysis (U.S. Pat. No. 5,482,908A). The polymerization of PO or the mixture of EO/PO using alcohol/water as initiators to produce PEPO is of substantial industrial importance. PEPOs are further categorized according to their end-use. Higher molecular weight polyols with molecular weights from 2000 to 10,000 are used to make more flexible PU, while lower molecular weight polyols are used for making more rigid products.

In the present invention, DMC catalysts, which are prepared in the presence of a complexing agent, are amorphous and are highly active for epoxide polymerization to produce a wide range of PEPO. When the complexing agents of our invention are used, the resulting catalysts actively polymerize epoxides. On the contrary, DMC catalysts prepared in the absence of complexing agents are proved to be less active for epoxide polymerization due to its highly crystalline nature (U.S. Pat. Nos. 5,731,407A, 6,018,017A). Other co-complexing agents have also been used to synthesize the DMC complexes. The addition of a co-complexing agent in DMC complexes showed higher activity in producing PEPO as compared to a catalyst made with only a complexing agent (U.S. Pat. No. 5,482,908A).

DMC catalysts show higher activity for epoxide polymerization when compared with the conventional single metal-based catalyst (e.g., KOH). DMC catalyst generally requires an "induction" period for its activation to produce PEPO. The activation of epoxide for the initiation of the ring-opening step in the presence of small amounts of epoxide and DMC catalyst is known as induction. It means the polymerization of epoxides after the addition of DMC to the initiator needs some start-up time; this is usually 1 hour or more. Once the induction period is completed, the balance amount of epoxides is then added to the mixture to complete the polymerization reaction. Therefore, this induction time makes this operating process cost-intensive by increasing the reaction time. The development of catalyst design, therefore, should aim at minimizing this induction time to make the process cost-effective.

DMC catalyst is generally used to produce PEPO. The removal of the DMC catalyst from the product PEPO is essential before being used for the production of PU. Chemical methods are used in general for the removal of metal ions present as impurities in the product PEPO. However, recent developments in DMC catalysts have made this possible by just a simple filtration step to remove the DMC catalysts after some chemical treatment (U.S. Pat. Nos. 4,355,188A, 4,877,906A).

The advantage of the DMC catalyst is that it produces high molecular weight PEPO with lesser catalyst dosage and reaction time and with relatively low unsaturation as compared to the conventional single metal-based catalyst. PEPO produced from the DMC catalysis method generally contains low molecular weight polyols and DMC as impurities. The restriction of low molecular weight PEPO is allowed up to 10 wt % along with the removal of DMC to improve PU production quality (PDI ~1.5). Generally, an organic complexing agent is added to the DMC complex to enhance the activity of the catalyst for the ROP of epoxides. Since it is reported to have DMC catalyst inactive in the absence of an organic complexing agent (U.S. Pat. Nos. 5,731,407A, 6,018,017A). Therefore, in our work, EDTA has been chosen as a novel organic complexing agent, which is proven to be highly active in enhancing the activity of DMC catalysts (PEPO-4, and PEPO-9). Also, chemical methods to remove DMC residues are sometimes difficult due to its high complexity with the coordinated organic complexing agents and emerged as a drawback of the DMC catalyst. Some of the chemical methods required for the catalyst removal from PEPO are mentioned in U.S. Pat. Nos. 4,355,188A and 4,877,906A. These methods are time consuming, labor intensive, and require additional materials for its removal from PEPO. Therefore, the ongoing development of the catalyst is aimed to prepare such catalysts for the synthesis of PEPO, which does not require chemical treatment method for its removal. In our work, DMC catalyst with EDTA as an organic complexing agent was easily removed from PEPO products by ordinary filtration. DMC catalyst in our work was used at low concentration for the production of PEPO. Moreover, The DMC catalyst is mainly prepared at elevated temperature by the methods mentioned in U.S. Pat. No. 7,811,958 B2, CA 2,252,398 C, US 2005/0027145A1, EP 1,634,644A1 and U.S. Pat. No. 9,605,111 B2. However, the present invention provides a method for the synthesis of DMC catalysts at room temperature.

OBJECTIVES OF THE INVENTION

Main objective of the present invention is to provide double metal cyanide [DMC] catalyst useful for the production of polyether polyols.

Another objective of the present invention is to provide a method for the synthesis of DMC catalysts.

Yet another objective of the present invention is to provide a method for the room temperature synthesis of physically separable zinc-iron and zinc-cobalt based DMC catalyst using EDTA as an organic complexing agent.

Yet another objective of the present invention is to produce PEPO of various viscosity ranges using DMC catalyst in a batch reactor.

Yet another objective of the present invention is to use different initiators such as ethylene glycol (EG), 1,4-butanediol (1,4-BD), dipropylene glycol (DPG), neopentyl glycol (NPG), glycerol, polyethylene glycol (PEG)-2000, EO/PO copolymer diol for the production of PEPO.

Yet another objective of the present invention is to optimize reaction conditions such as time, temperature, pressure, catalyst amount, and feed to initiator ratio to produce >90% yield of PEPO.

SUMMARY OF THE INVENTION

Figure 1:
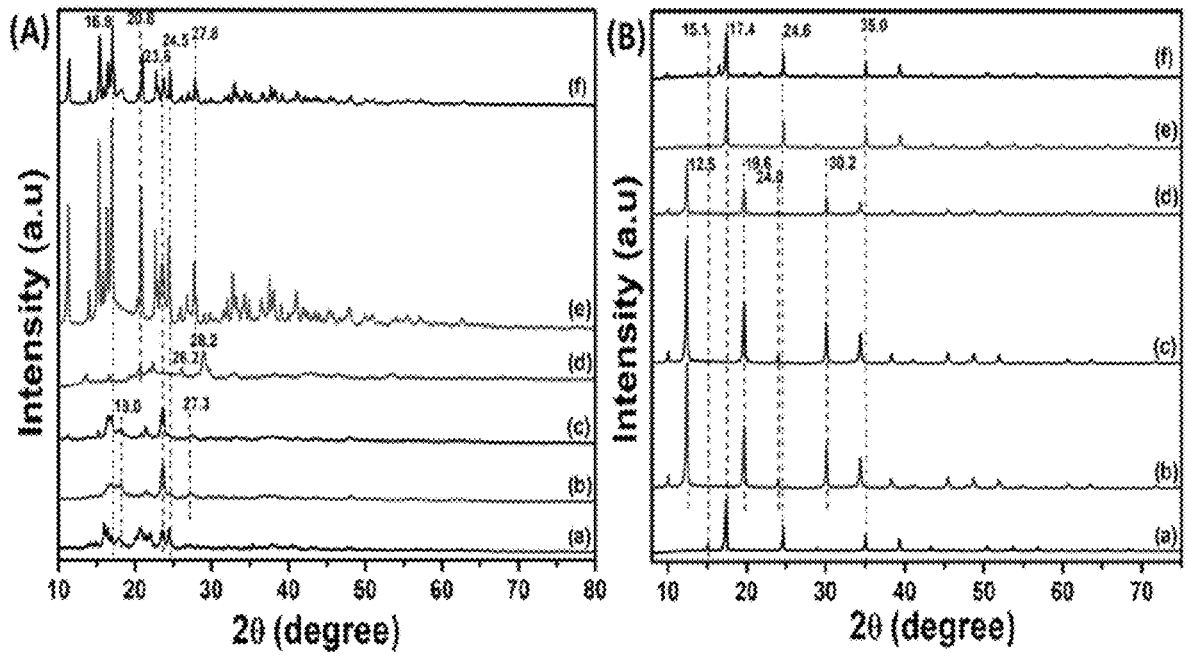
FIG. 1 (A) represents PXRD analysis of prepared catalysts (a) DMC-2 (b) DMC-3 (c) DMC-4 (d) DMC-6 (e) DMC-7 (f) DMC-14 catalysts, 1 (B): PXRD analysis of (a) DMC-9 (b) DMC-10 (c) DMC-11 (d) DMC-12 (e) DMC-13 (f) DMC-15 catalysts.
Figure 2:
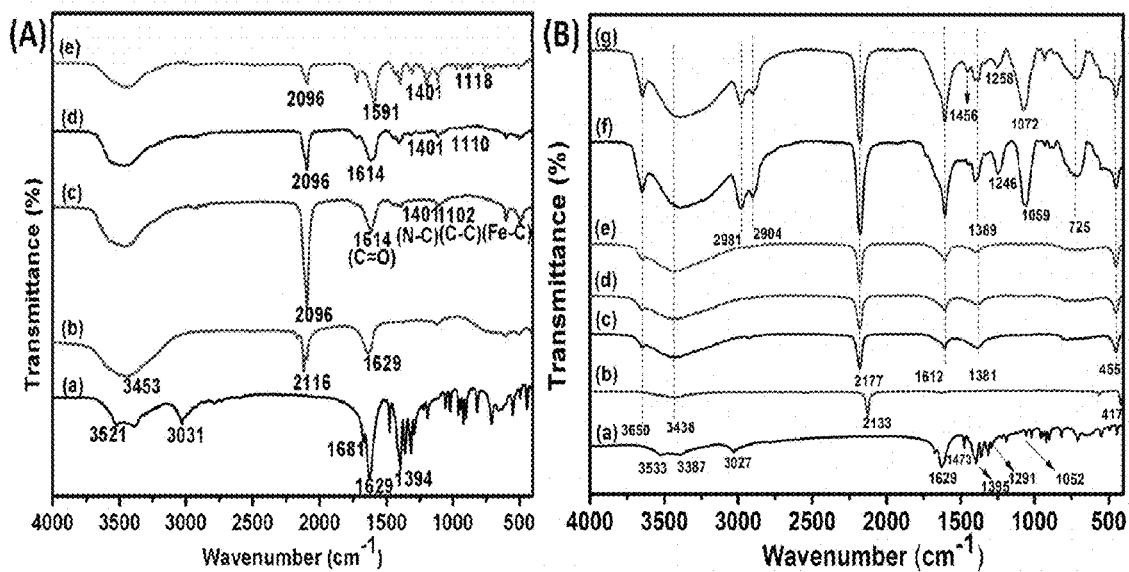
FIG. 2 (A) represents FT-IR analysis of prepared DMC catalysts (a) EDTA (b) $K_3[Fe(CN)_6]$ (c) DMC-2 (d) DMC-3 (e) DMC-4 catalysts, 2 (B): FT-IR spectra of (a) EDTA (b) $K_3[Co(CN)_6]$ (c) DMC-9 (d) DMC-10 (e) DMC-11 (f) DMC-12 (g) DMC-13 catalysts.
Figure 3:
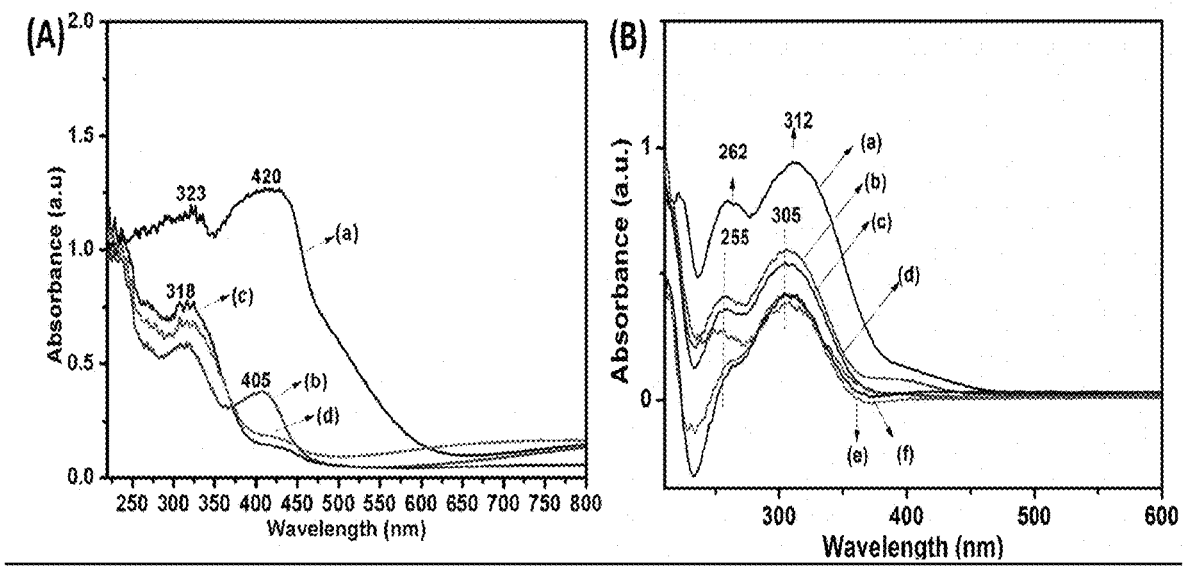
FIG. 3 (A) represents UV-Vis Spectra analysis of prepared DMC catalysts (a) $K_3[Fe(CN)_6]$ (b) DMC-2 (c) DMC-3 (d) DMC-4 catalysts 3 (B): UV-Vis Spectra of (a) $K_3[Co(CN)_6]$ (b) DMC-9 (c) DMC-10 (d) DMC-11 (e) DMC-12 and (f) DMC-13 catalysts.
Figure 4:
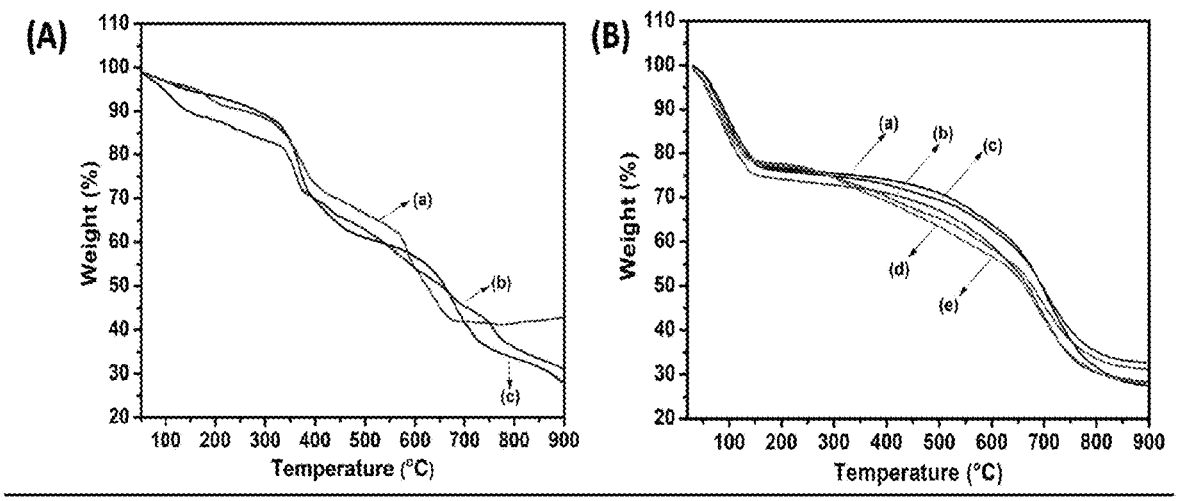
FIG. 4 (A) represents Thermogravimetric analysis (TGA) analysis of prepared DMC catalysts (a) DMC-2 (b) DMC-3 (c) DMC-4 catalysts; 4 (B): TGA of (a) DMC-9 (b) DMC-10 (c) DMC-11 (d) DMC-12 (e) DMC-13 catalysts
Figure 5:
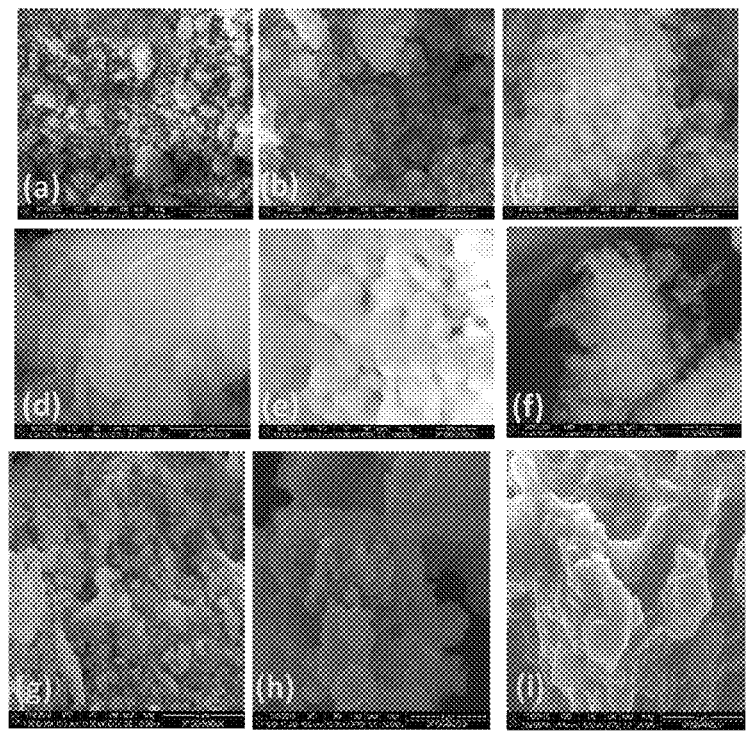
FIG. 5 represents SEM analysis of prepared DMC catalysts (a-b) DMC-9 (c) DMC-10 (d) DMC-11 (e) DMC-12 (f) DMC-13 (g) DMC-2 (h) DMC-3 and (i) DMC-4 catalysts
Figure 6:
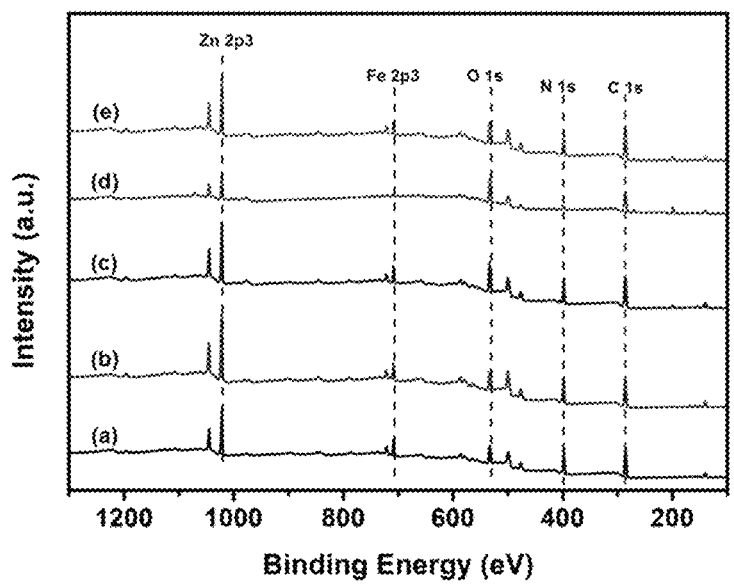
FIG. 6 represents XPS analysis of prepared DMC catalysts (a) DMC-2 (b) DMC-3 (c) DMC-4 (d) DMC-5 (e) DMC-6 catalysts.

Accordingly, the present invention provides a double metal cyanide [DMC] catalyst comprising:
a) 25 to 75 wt % double metal cyanide [DMC] complex;
b) 25 to 74 wt % an organic complexing agent;
c) 1 to 10 wt % co-complexing agent.

In an embodiment of the present invention, DMC complex is selected from the group consisting of zinc(II)hexacyanocobaltate(III), zinc(II)hexacyanoferrate(II), zinc(II) hexacyanoferrate(III), cobalt(II) hexacyanoferrate(III), manganese(II) hexacyanoferrate(III), nickel(II) hexacyanoferrate(III), manganese(II) hexacyanocobaltate(III) and nickel(II) hexacyanocobaltate(III).

In another embodiment of the present invention, an organic complexing agent is selected from EDTA, EDTA alkali metal salt, and a mixture thereof.

In yet another embodiment of the present invention, the co-complexing agent used is selected from t-BuOH and PEPO or a combination thereof.

In yet another embodiment of the present invention, DMC catalyst is selected from the group consisting of:
i. Zinc hexacyanoferrate-EDTA catalyst (DMC-1);
ii. Zinc hexacyanoferrate-EDTA catalyst (DMC-2);
iii. Zinc hexacyanoferrate-EDTA catalyst (DMC-3);
iv. Zinc hexacyanoferrate-EDTA catalyst (DMC-4);
v. Zinc hexacyanoferrate-EDTA catalyst (DMC-5);
vi. Zinc hexacyanoferrate-EDTA-t-BuOH catalyst (DMC-6);
vii. Zinc hexacyanoferrate-EDTA-PEPO catalyst (DMC-7);
viii. Zinc hexacyanocobaltate-EDTA catalyst (DMC-8);
ix. Zinc hexacyanocobaltate-EDTA catalyst (DMC-9);
x. Zinc hexacyanocobaltate-EDTA catalyst (DMC-10);
xi. Zinc hexacyanocobaltate-EDTA catalyst (DMC-11);
xii. Zinc hexacyanocobaltate-EDTA-t-BuOH catalyst (DMC-12);
xiii. Zinc hexacyanocobaltate-EDTA-PEPO catalyst (DMC-13).

In yet another embodiment, the present invention provides a process for the synthesis of DMC catalyst as claimed in claim 1, comprising the steps of:
a) reacting an aqueous solution of metal salts of formula $M(B)_n$ and metal cyanide salt of formula $(A)_xM'(CN)_y$;
wherein M is selected from the group consisting of Zn(II), Fe(II), Pb(II), Mo(IV), Al(III), Mn(II), V(IV), V(V), W(IV), W(VI), Co(II), Sn(II), Cu(II), Cr(III), Ni(II);
B is an anion selected from the group consisting of halides, sulfates, hydroxides, cyanides, oxalates, isocyanates, thiocyanates, isothiocyanates, carboxylates, and nitrates;
n is selected from 1 to 3, which satisfies the valency of M;
A is selected from an alkali metal ion or alkaline earth metal ion;

M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V);

Both x and y are integers greater than or equal to 1, and the sum of the charges of x and y balances the charge of M'.

in a ratio ranging between 1:1 to 50:1 in the presence of an organic complexing agent and co-complexing agent to obtain a reaction slurry;

b) mixing the slurry as obtained in step (a) with polyethylene glycol (PEG) with the number average molecular weight ranging from 200 to 400 $M_w$ and a solvent and homogenizing this mixture for a period in the range of 1 to 10 min, followed by one time centrifugation to obtain a solid cake;

c) adding the aqueous solutions of PEG ($M_w$=200 to 400), and a solvent to the solid cake obtained in step (b) at room temperature in the range of 8 to 40° C. for a period in the range of 5 to 30 min followed by precipitation, centrifugation, and vacuum drying for a period in the range of 8-12 h to attain the DMC catalyst.

In yet another embodiment of the present invention, solvent used in step (b) and (c) is selected from tetrahydrofuran [THF] or Acetonitrile [ACN].

In yet another embodiment, the present invention provides a process for ring opening polymerization (ROP) of propylene oxide with initiators to produce PEPO having a molecular weight between 200 to 1000 $M_w$ using the catalyst as claimed in claim 1 comprising the steps of:

a. taking 375 ppm to 7500 ppm DMC catalyst, initiator, and propylene oxide (PO) in a Teflon lined reactor and running the ROP reaction at a temperature in the range of 8 to 150° C. and pressure in the range of 1 bar to 20 bar for a time period in the range of 1 to 24 h to obtain a mixture;

b. cooling down the reactor to room temperature in the range of 8 to 39° C. after completion of reaction;

c. separating unreacted PO from produced PEPO followed by vacuum drying at a temperature in the range of 40° C. to 70° C. to obtain 80 to 98.7% PEPO.

In yet another embodiment of the present invention, propylene oxide and initiator ratio is ranging between 2:1 to 2200:1.

In yet another embodiment of the present invention, the initiator used is selected from the group consisting of Ethylene glycol, 1, 4-butane diol, dipropylene glycol, neopentyl glycol, glycerol, PEG-2000, or EO/PO copolymer diol.

In yet another embodiment of the present invention, PEPO is having a kinematic viscosity of 9 to 87063 $mm^2/s$.

DETAILED DESCRIPTION OF THE INVENTION

The present invention relates to an amorphous DMC catalyst useful for ring-opening polymerization of epoxides with different initiators to produce highly viscous PEPO and a process thereof. The amorphous DMC catalyst comprises a DMC complex, ranging from about 25 to 75 wt %, an organic complexing agent, ranging about 24 to 74 wt %, and a co-complexing agent, ranging about 1 to 10 wt %. The catalysts are useful for preparing PEPO over a wide range of kinematic viscosity ranges. The catalyst showed enhanced activity for epoxide polymerization reactions compared with a similar catalyst prepared in the absence of the co-complexing agent.

In the present invention, it is found that the amorphous DMC catalysts containing a varying composition of the complexing agent are non-crystalline and showed a range of different catalyst activity, and were successful in producing PEPO of various kinematic viscosity ranges over a wide range. Also, the amorphous DMC catalyst having a co-complexing agent in the complex showed comparative activity compared to the catalyst made in the absence of the co-complexing agent. t-BuOH and PEPO ($M_w$=200 to 1000 g/mol) have been used as a co-complexing agent along with EDTA as a complexing agent in the DMC complex. Catalysts of the invention are easily separable by simple filtration, which obviates the need for centrifugation after the production of PEPO. The incorporation of complexing agents and PEPO into the DMC catalyst also showed higher activity for the synthesis of PEPO when compared with the single metal-based catalyst (e.g., KOH). The DMC catalysts of the invention are used at very low concentrations due to their higher activity for the production of PEPO. Also, the DMC catalyst synthesis route is a simple room temperature scheme leading to highly active and easily separable from product PEPO with recyclability/recoverability, making the product PEPO with high yield.

During ring-opening polymerization of epoxides, a side reaction of the base in polymerization is the isomerization reaction, such as PO isomerizes to allyl alcohol, and as a result, vinyl-terminated monofunctional polyols are formed. This type of monofunctional polyols are known as monols. The final products obtained from monols have a detrimental effect on the mechanical properties of the polymer. The monol formation in the PEPO can be suppressed by using a particular type of catalysts, e.g., zinc(II) hexacyanocobaltate (III), zinc(II) hexacyanoferrate(II) and zinc(II) hexacyanoferrate(III), nickel(II) hexacyanoferrate(II). These types of catalysts are known as the DMC catalyst.

DMC catalyst is generally a mixture of water-soluble metal salts and water-soluble metal cyanide salts wherein water-soluble metal salts contains the formula of M(B)n where M is selected from the group consisting of Zn(II), Fe(II), Pb(II), Mo(IV), Al(III), Mn(II), V(IV), V(V), W(IV), W(VI), Co(II), Sn(II), Cu(II), Cr(III) and Ni(II). B is generally an anion selected from the group consisting of halides, sulfates, hydroxides, cyanides, oxalates, isocyanates, thiocyanates, isothiocyanates, carboxylates, and nitrates. Most preferably, M is selected from the group consisting of Zn(II), Co(II), Fe(II), Fe(III), Cr(III), and Ni(II). Here "n" be selected from 1 to 3, which satisfies the valency of M.

Examples of suitable metal salts include, but are not limited to, zinc(II) chloride, zinc(II) bromide, zinc(II) acetate, zinc(II)acetonylacetate, zinc(II) benzoate, zinc(II) nitrate, iron(II) sulfate, iron(II) bromide, cobalt(II) chloride, cobalt(II) thiocyanate, nickel(II) formate, nickel(II) nitrate, and the like, and mixtures thereof.

The cyanide salts of the invention to make DMC complexes have the formula $(A)_xM'(CN)_y$, where A is an alkali metal ion or alkaline earth metal ion preferably potassium (K), and M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II), preferably Fe(II) and Co(II). Both x and y are integers greater than or equal to 1; the sum of the charges of x and y balances the charge of M'.

In the present invention, DMC catalysts are selected from Zinc hexacyanoferrate-EDTA, Zinc hexacyanoferrate-EDTA-t-BuOH, Zinc hexacyanoferrate-EDTA-PEPO, Zinc hexacyanocobaltate-EDTA, Zinc hexacyanocobaltate-EDTA-t-BuOH, Zinc hexacyanocobaltate-EDTA-PEPO, manganese hexacyanoferrate-EDTA, nickel hexacyanoferrate-EDTA, manganese hexacyanocobaltate-EDTA, and nickel hexacyanocobaltate-EDTA, using EDTA as an organic complexing agent with t-BuOH and PEPO as the co-complexing agents.

In the present invention, the DMC complex includes zinc(II)hexacyanocobaltate(III), zinc(II)hexacyanoferrate (II), zinc(II)hexacyanoferrate(III), cobalt(II) hexacyanoferrate(III), manganese(II) hexacyanoferrate(III), nickel(II) hexacyanoferrate(III), manganese(II) hexacyanocobaltate (III) and nickel(II) hexacyanocobaltate and like The critical component of the present invention is EDTA, which has been used as an organic complexing agent to synthesize the DMC catalyst. Generally, organic complexing agents are relatively soluble in water. The complexing agents are added to the reaction mixture during or during precipitation of the DMC catalyst. As a general practice, an excess amount of complexing agents is used to synthesize the DMC catalyst, leading to activity to produce high molecular weight products, e.g., PEPO. Accordingly, water-soluble and hetero-atoms containing an organic compound that can form a complex with the DMC are preferred. The complexing agent of the present invention was also reasonably soluble in water and made a highly active DMC catalyst to produce PEPO over a wide range of kinematic viscosity. The composition of the complexing agent was varied during the synthesis of the DMC catalyst, leading to catalysts of change in catalytic activity for the production of PEPO. Suitable complexing agents include, but are not limited to, EDTA, EDTA alkali metal salts, and mixtures thereof. Preferred complexing agents are water-soluble EDTA and EDTA salts. The most preferred complexing agent is EDTA to prepare the DMC catalyst.

The preferable co-complexing agents are alcohols, aldehydes, ketones, ethers, esters, amides, urea, nitriles, and sulfides. Accordingly, the preferred co-complexing agents would include ethanol, propanols, butanols, pentanols, hexanols, and long-chain alcohols. The most preferable co-complexing alcohol is t-BuOH.

The DMC catalyst of the present invention was able to achieve a yield of 80-98% PEPO with a viscosity ranging from 9 to 87063 $mm^2/s$.

The metal (Zn, Fe, and Co) content present in the DMC catalysts was determined by Atomic Absorption Spectroscopy (AAS), and the results are given in Table-1 and 2.

The water solubility of the organic complex in the DMC catalyst has also been an essential factor in the active DMC catalyst. Furthermore, co-complexing agents have also been incorporated into the DMC complex for better catalytic activity. Co-complexing agents are generally used to enhance the activity of the catalyst to produce different molecular weight PEPO. In the present invention, PEPO produced by DMC catalysts has also been used as a co-complexing agent, which further showed comparable activity with higher yields for the PEPO. Water solubility has also been an essential factor in incorporating functionalized polymers to produce and precipitate the DMC catalyst. The preferred organic complexing agents are generally the functional groups that contain oxygen, nitrogen, sulfur, phosphorus, or halogen, which have good water solubility and, therefore, miscible with the aqueous solution of metal salts. Also, organic solvents such as THF, acetone, acetonitrile (ACN), and like are used and preferred as a solvent to form the DMC catalyst.

In the present invention, zinc hexacyanoferrate (III) based DMC catalysts (DMC-1 to DMC-7) were prepared using different EDTA:$K_3[Fe(CN)_6]$ ratios varying from 1:1 to 50:1 among which DMC catalyst wherein, 11:1 ratio of EDTA:$K_3[Fe(CN)_6]$ was used (DMC-4) produced a higher yield of PEPO contain zinc and iron in the range of 23.2 wt % and 13.2 wt %, respectively. Similarly, zinc hexacyanocobaltate (III) based DMC catalysts (DMC-8 to DMC-13) were also prepared using different EDTA:$K_3[Co(CN)_6]$ ratios varying from 1:1 to 14:1 among which DMC catalyst wherein 7:1 of EDTA:$K_3[Co(CN)_6]$ ratio was used (DMC-9) contain zinc and cobalt within a range of 24.1 wt % and 11.4 wt %, respectively and produced highly yielded PEPO. Also, the DMC-6 catalyst (Zinc hexacyanoferrate-EDTA-t-BuOH) contains zinc and iron within a range of 21.4% and 6.6%, respectively, wherein, 11:1 of EDTA:$K_3[Fe(CN)_6]$ ratio was used, and DMC-12 catalyst (Zinc hexacyanocobaltate-EDTA-t-BuOH) contains zinc and cobalt within range of 24.8% and 11.9% respectively when 14:1 of EDTA:$K_3[Co(CN)_6]$ ratio was used. The DMC catalyst wherein, DMC-7 catalyst (Zinc hexacyanoferrate-EDTA-PEPO) contains zinc and iron within a range of 20.7% and 2.6% respectively when 11:1 of EDTA:$K_3[Fe(CN)_6]$ ratio was used, and DMC-13 catalyst (Zinc hexacyanocobaltate-EDTA-PEPO) contains zinc and cobalt within range of 24.0% and 11.4% respectively when 14:1 of EDTA:$K_3[Co(CN)_6]$ ratio was used.

EXAMPLES

The following examples are given by way of illustration only and therefore should not be construed to limit the scope of the present invention.

Example 1: Catalyst Preparation: Zinc Hexacyanoferrate-EDTA Catalyst (DMC-1) Using EDTA as an Organic Complexing Agent (EDTA to Potassium Hexacyanoferrate Ratio as 1:1)

0.85 g of EDTA was dissolved in 10 mL of deionized (DI) water and homogenized for 10 min, and labeled as solution A. 12 g of Zinc chloride was dissolved in 23 mL of DI water and labeled as solution B. A mixture of 0.75 g of Potassium hexacyanoferrate and 10 mL of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (15° C.), followed by the addition of solution D to the slurry and again homogenized for 5 min. This mixture was centrifuged at 6000 rpm for 10 min to obtain a solid cake. This solid cake was added to a mixture of 0.3 g of PEG-200 and 0.2 g of THF in 30 mL of DI water and homogenized for 30 min at room temperature (15° C.). The resulting white solid formed was washed with DI water to remove all the un-complexed ions and dried overnight (10 h) at 70° C. under the vacuum. The resulting catalyst was designated as DMC-1.

Elemental analysis of the solid DMC catalyst showed: Zn=35.6 wt %; Fe=17.3 wt %.

Example 2: Zinc Hexacyanoferrate-EDTA Catalyst (DMC-2) Using EDTA as an Organic Complexing Agent (EDTA to Potassium Hexacyanoferrate Ratio as 5.5:1)

This example shows the preparation of a zinc hexacyanoferrate:EDTA catalyst using EDTA to Potassium hexacyanoferrate ratio in 5.5:1 (also made using the DMC catalyst preparation method).

Catalyst Preparation: The procedure of example 1 was followed, except the 5.5:1 ratio of EDTA (4.55 g) to Potassium hexacyanoferrate (0.75 g) was used instead of 1:1 at room temperature (22° C.). The resulting white solid formed was washed with DI water to remove all the un-complexed ions and dried overnight (9 h) at 70° C. under the vacuum and as described in example 1. The resulting catalyst was designated as DMC-2. Powder X-ray diffraction (PXRD) analysis of DMC-2 showed two major signals of 2θ values at 16.9° and 23.6°. Elemental analysis of the solid DMC catalyst showed: Zn=33.3 wt %; Fe=16.5 wt %.

Example 3: Preparation of Zinc Hexacyanoferrate-EDTA Catalyst (DMC-3) (EDTA to Potassium Hexacyanoferrate Ratio as 8:1)

This example shows the preparation of a zinc hexacyanoferrate:EDTA catalyst using EDTA to Potassium hexacyanoferrate ratio in 8:1 (also made using the DMC catalyst preparation method).

Catalyst Preparation: The procedure of example 1 was followed, except the 8:1 ratio of EDTA (6.70 g) to Potassium hexacyanoferrate (0.75 g) was used instead of 1:1 at room temperature (18° C.). The resulting white solid formed was washed with DI water to remove all the un-complexed ions and dried overnight (12 h) at 70° C. under the vacuum and as described in example 1. The resulting catalyst was designated as DMC-3. PXRD analysis of DMC-3 showed two broad signals of 2θ value at 16.9° and 23.6°. Elemental analysis of the solid DMC catalyst showed: Zn=22.3 wt %; Fe=11.3 wt %.

Example 4: Preparation of Zinc Hexacyanoferrate-EDTA Catalyst (DMC-4) (EDTA to Potassium Hexacyanoferrate Ratio as 11:1)

Catalyst Preparation: The procedure of example 1 was followed, except 11:1 ratio of EDTA (9.06 g) to Potassium hexacyanoferrate (0.75 g) was used instead of 1:1 at room temperature (17° C.). The resulting white solid formed was washed with DI water to remove all the un-complexed ions and dried overnight (12 h) at 70° C. under the vacuum and as described in example 1. The resulting catalyst was designated as DMC-4. PXRD analysis of DMC-4 showed two major signals of 2θ values at 16.9° and 23.6°. Elemental analysis of the solid DMC catalyst showed: Zn=23.2 wt %; Fe=13.2 wt %.

Example 5: Preparation of Zinc Hexacyanoferrate-EDTA Catalyst (DMC-5) (EDTA to Potassium Hexacyanoferrate Ratio as 50:1)

Catalyst Preparation: The procedure of example 1 was followed, except 50:1 ratio of EDTA (41 g) to Potassium hexacyanoferrate (0.75 g) was used instead of 1:1 at room temperature (24° C.). The resulting white solid formed was washed with DI water to remove all the un-complexed ions and dried overnight (8 h) at 70° C. under the vacuum and as described in example 1. The resulting catalyst was designated as DMC-5.

Elemental analysis of the solid DMC catalyst showed: Zn=15.5 wt %; Fe=5.4 wt %.

Example 6: Zinc Hexacyanoferrate-EDTA-t-BuOH Catalyst (DMC-6) (EDTA to Potassium Hexacyanoferrate Ratio as 11:1 and t-BuOH as a Co-Complexing Agent)

9.06 g of EDTA and 5 mL of t-BuOH were dissolved in 10 mL of DI water and homogenized for 10 min, and labeled as solution A. 12 g of Zinc chloride was dissolved in 23 mL of DI water and labeled as solution B. A mixture of 0.75 g of Potassium hexacyanoferrate and 10 ml of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (16° C.), followed by the addition of solution D to the slurry and again homogenized for 5 min. This mixture was centrifuged at 6000 rpm for 10 min to obtain a solid cake. This solid cake was added to a mixture of 1.85 mL of t-BuOH, 0.3 g of PEG-200, and 0.2 g of THF in 30 mL of DI water and homogenized for 30 min at room temperature (16° C.). The resulting white solid formed was washed with DI water to remove all the un-complexed ions and dried overnight (9 h) at 70° C. under the vacuum. The resulting catalyst was designated as DMC-6.

PXRD analysis of DMC-6 showed two major broad signals of 2θ values at 16.9° and 20.8°.

Elemental analysis of the solid DMC catalyst showed: Zn=21.4 wt %; Fe=6.6 wt %.

Example 7: Zinc Hexacyanoferrate-EDTA-PEPO Catalyst (DMC-7) (EDTA to Potassium Hexacyanoferrate Ratio as 11:1 and PEPO as a Co-Complexing Agent)

9.06 g of EDTA was dissolved in 10 mL of DI water and homogenized for 10 min, and labeled as solution A. 12 g of Zinc chloride was dissolved in 23 mL of DI water and labeled as solution B. A mixture of 0.75 g of Potassium hexacyanoferrate and 10 mL of DI water was labeled as solution C. Similarly, Solution D was prepared by dissolving 0.8 g of PEPO (≈1000 $M_w$) in 5 mL of DI water and 0.2 mL of THF. Solution A and Solution B were homogenized together for 10 min and designated as solution E. Solution C was added to the above solution E and homogenized for 35 min at room temperature (11° C.), followed by the addition of solution D to the slurry and again homogenized for 5 min. This mixture was centrifuged at 6000 rpm for 10 min to obtain a solid cake. This solid cake was added to a mixture of 0.3 g of PEPO (≈1000 $M_w$) and 0.2 g of THF in 30 mL of DI water and homogenized for 30 min at room temperature (11° C.). The resulting white solid formed was washed with DI water to remove all the un-complexed ions and dried overnight (11 h) at 70° C. under the vacuum. The resulting catalyst was designated as DMC-7.

PXRD analysis of DMC-7 showed two major signals of 2θ values at 16.9° and 20.8°. Elemental analysis of the solid DMC catalyst showed: Zn=20.7 wt %; Fe=2.6 wt %.

Example 8: Preparation of Zinc Hexacyanocobaltate-EDTA Catalyst (DMC-8) (EDTA to Potassium Hexacyanocobaltate Ratio as 1:1)

0.85 g of EDTA was dissolved in 10 mL of DI water and homogenized for 10 min, and labeled as solution A. 12 g of Zinc chloride was dissolved in 23 mL of DI water and labeled as solution B. A mixture of 0.66 g of Potassium hexacyanocobaltate and 10 mL of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (29° C.), followed by the addition of solution D to the slurry and again homogenized for 5 min. This mixture was centrifuged at 6000 rpm for 10 min to obtain a solid cake. This solid cake was added to a mixture of 0.3 g of PEG-200 and 0.2 g of THF in 30 mL of DI water and homogenized for 30 min at room temperature (29° C.). The resulting white solid formed was washed with DI water to remove all the un-complexed ions and dried overnight (12 h) at 70° C. under the vacuum. The resulting catalyst was designated as DMC-8.

Elemental analysis of the solid DMC catalyst showed: Zn=32.3 wt %; Co=11.4 wt %.

Example 9: Preparation of Zinc Hexacyanocobaltate-EDTA Catalyst (DMC-9) (EDTA to Potassium Hexacyanocobaltate Ratio as 7:1)

Catalyst preparation: The procedure of example 8 is followed, except the 7:1 ratio of EDTA (4.55 g) to Potassium hexacyanocobaltate (0.66 g) is used instead of 1:1 at room temperature (39° C.). The resulting white solid formed was washed with DI water to remove all the un-complexed ions and dried overnight (12 h) at 70° C. under the vacuum and as described in example 8. The resulting catalyst was designated as DMC-9. PXRD analysis of the DMC-9 showed two major signals of 2θ values at 17.4° and 24.6°.

Elemental analysis of the solid DMC catalyst showed: Zn=24.1 wt %; Co=11.4 wt %.

Example 10: Preparation of Zinc Hexacyanocobaltate-EDTA Catalyst (DMC-10) (EDTA to Potassium Hexacyanocobaltate Ratio as 10:1)

Catalyst preparation: The procedure of example 8 is followed, except the 10:1 ratio of EDTA (6.70 g) to Potassium hexacyanocobaltate (0.66 g) is used instead of 1:1 at room temperature (39° C.). The resulting white solid formed was washed with DI water to remove all the un-complexed ions and dried overnight (12 h) at 70° C. under the vacuum and as described in example 8. The resulting catalyst was designated as DMC-10. PXRD analysis of DMC-10 showed two major signals of 2θ values at 12.5° and 19.6°. Elemental analysis of the solid DMC catalyst showed: Zn=22.5 wt %; Co=6.1 wt %.

Example 11: Preparation of Zinc Hexacyanocobaltate-EDTA Catalyst (DMC-11) (EDTA to Potassium Hexacyanocobaltate Ratio as 14:1)

Catalyst preparation: The procedure of example 8 is followed, except the 14:1 ratio of EDTA (9.06 g) to Potassium hexacyanocobaltate (0.66 g) is used instead of 1:1 at room temperature (28° C.). The resulting white solid formed was washed with DI water to remove all the un-complexed ions, and dried overnight (11 h) at 70° C. under the vacuum and as described in example 8. The resulting catalyst was designated as DMC-11. PXRD analysis of DMC-11 showed two major signals of 2θ values at 12.5° and 19.6°. Elemental analysis of the solid DMC catalyst showed: Zn=18.0 wt %; Co=3.5 wt %.

Example 12: Zinc Hexacyanocobaltate-EDTA-t-BuOH Catalyst (DMC-12) (EDTA to Potassium Hexacyanocobaltate Ratio as 14:1 and t-BuOH as a Co-Complexing Agent)

9.06 g of EDTA and 5 mL of t-BuOH were dissolved in 10 mL of DI water and homogenized for 10 min, and labeled as solution A. 12 g of Zinc chloride was dissolved in 23 mL of DI water and labeled as solution B. A mixture of 0.66 g of Potassium hexacyanocobaltate and 10 ml of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (25° C.), followed by the addition of solution D to the slurry and again homogenized for 5 min. This mixture was centrifuged at 6000 rpm for 10 min to obtain a solid cake. This solid cake was added to a mixture of 1.85 mL of t-BuOH, 0.3 g of PEG-200, and 0.2 g of THF in 30 mL of DI water and homogenized for 30 min at room temperature (25° C.). The resulting white solid formed was washed with DI water to remove all the un-complexed ions and dried overnight (12 h) at 70° C. under the vacuum. The resulting catalyst was designated as DMC-12.

PXRD analysis of the DMC-12 showed two major signals of 2θ values at 12.5° and 19.6°. Elemental analysis of the solid DMC catalyst showed: Zn=24.8 wt %; Co=11.9 wt %.

Example 13: Zinc Hexacyanocobaltate-EDTA-PEPO Catalyst (DMC-13) (EDTA to Potassium Hexacyanocobaltate Ratio as 14:1 and PEPO as a Co-Complexing Agent)

9.06 g of EDTA was dissolved in 10 mL of DI water and homogenized for 10 min, and labeled as solution A. 12 g of Zinc chloride was dissolved in 23 mL of DI water and labeled as solution B. A mixture of 0.66 g of Potassium hexacyanocobaltate and 10 mL of DI water was labeled as solution C. Similarly, Solution D was prepared by dissolving 0.8 g of PEPO ($\approx$1000 $M_w$) in 5 mL of DI water and 0.2 mL of THF. Solution A and Solution B were homogenized together for 10 min and designated as solution E. Solution C was added to the above solution E and homogenized for 35 min at room temperature (21° C.), followed by the addition of solution D to the slurry and again homogenized for 5 min. This mixture was centrifuged at 6000 rpm for 10 min to obtain a solid cake. This solid cake was added to a mixture of 0.3 g of PEPO ($\approx$1000 $M_w$) and 0.2 g of THF in 30 mL of DI water and homogenized for 30 min at room temperature (21° C.). The resulting white solid formed was washed with DI water to remove all the un-complexed ions and dried overnight (8 h) at 70° C. under the vacuum. The resulting catalyst was designated as DMC-13. PXRD analysis of DMC-13 showed two major signals of 2θ values at 12.5° and 19.6°. Elemental analysis of the solid DMC catalyst showed: Zn=24.0 wt %; Co=11.4 wt %.

Example 14: Manganese Hexacyanoferrate-EDTA Catalyst (EDTA to Potassium Hexacyanoferrate Ratio as 14:1

9.06 g of EDTA was dissolved in 10 mL of deionized (DI) water and homogenized for 10 min and labeled as solution A. 17.4 g of manganese(II) chloride was dissolved in 23 mL of DI water and labeled as solution B. A mixture of 0.75 g of Potassium hexacyanoferrate and 10 mL of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (25° C.), followed by the addition of solution D to the slurry and again homogenized for 5 min. This mixture was centrifuged at 6000 rpm for 10 min to obtain a solid cake. This solid cake was added to a mixture of 0.3 g of PEG-200 and 0.2 g of THF in 30 mL of DI water and homogenized for 30 min at room temperature (25° C.). The resulting white solid formed was washed with DI water to remove all the un-complexed ions and dried overnight (9 h) at 70° C. under the vacuum. The resulting catalyst was designated as DMC-14. The effect of the DMC-14 catalyst was also checked on the yield and kinematic viscosity of PEPO. The results are mentioned in table 4.

Elemental analysis of the solid DMC catalyst showed: Mn=5.8 wt %; Fe=0.7 wt %.

Example 15: Nickel Hexacyanoferrate-EDTA Catalyst (EDTA to Potassium Hexacyanoferrate Ratio as 14:1

9.06 g of EDTA was dissolved in 10 mL of deionized (DI) water and homogenized for 10 min and labeled as solution A. 20.9 g of nickel(II) chloride was dissolved in 23 mL of DI water and labeled as solution B. A mixture of 0.75 g of Potassium hexacyanoferrate and 10 mL of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (25° C.), followed by the addition of solution D to the slurry and again homogenized for 5 min. This mixture was centrifuged at 6000 rpm for 10 min to obtain a solid cake. This solid cake was added to a mixture of 0.3 g of PEG-200 and 0.2 g of THF in 30 mL of DI water and homogenized for 30 min at room temperature (25° C.). The resulting white solid formed was washed with DI water to remove all the un-complexed ions and dried overnight (11 h) at 70° C. under the vacuum. The resulting catalyst was designated as DMC-15. The effect of the DMC-15 catalyst was also checked on the yield and kinematic viscosity of PEPO. The results are mentioned in table 4. Elemental analysis of the solid DMC catalyst showed: Ni=7.1 wt %; Fe=1.2 wt %.

Example 16: Manganese Hexacyanocobaltate-EDTA Catalyst (EDTA to Potassium Hexacyanocobaltate Ratio as 7:1

4.55 g of EDTA was dissolved in 10 mL of deionized (DI) water and homogenized for 10 min and labeled as solution A. 17.4 g of manganese(II) chloride was dissolved in 23 mL of DI water and labeled as solution B. A mixture of 0.66 g of Potassium hexacyanocobaltate and 10 mL of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (22° C.), followed by the addition of solution D to the slurry and again homogenized for 5 min. This mixture was centrifuged at 6000 rpm for 10 min to obtain a solid cake. This solid cake was added to a mixture of 0.3 g of PEG-200 and 0.2 g of THF in 30 mL of DI water and homogenized for 30 min at room temperature (22° C.). The resulting white solid formed was washed with DI water to remove all the un-complexed ions and dried overnight (10 h) at 70° C. under the vacuum. The resulting catalyst was designated as DMC-16. The effect of the DMC-16 catalyst was also checked on the yield and kinematic viscosity of PEPO. The results are mentioned in table 4. Elemental analysis of the solid DMC catalyst showed: Mn=12.3 wt %; Co=0.9 wt %.

Example 17: Nickel Hexacyanocobaltate-EDTA Catalyst (EDTA to Potassium Hexacyanocobaltate Ratio as 7:1

4.55 g of EDTA was dissolved in 10 mL of deionized (DI) water and homogenized for 10 min and labeled as solution A. 20.9 g of nickel(II) chloride was dissolved in 23 mL of DI water and labeled as solution B. A mixture of 0.66 g of Potassium hexacyanocobaltate and 10 mL of DI water was labeled as solution C. Similarly, Solution D was prepared by dissolving 0.8 g of PEG-200 in 5 mL of DI water and 0.2 mL of THF. Solution A and Solution B were homogenized together for 10 min and designated as solution E. Solution C was added to the above solution E and homogenized for 35 min at room temperature (22° C.), followed by the addition of solution D to the slurry and again homogenized for 5 min.

This mixture was centrifuged at 6000 rpm for 10 min to obtain a solid cake. This solid cake was added to a mixture of 0.3 g of PEG-200 and 0.2 g of THF in 30 mL of DI water and homogenized for 30 min at room temperature (22° C.). The resulting white solid formed was washed with DI water to remove all the un-complexed ions and dried overnight (10 h) at 70° C. under the vacuum. The resulting catalyst was designated as DMC-17. The effect of the DMC-17 catalyst was also checked on the yield and kinematic viscosity of PEPO. The results are mentioned in table 4. Elemental analysis of the solid DMC catalyst showed: Ni=10.2 wt %; Co=1.7 wt %.

Comparative Example 18: Preparation of Zinc Hexacyanoferrate without any Complexing Agent (DMC-14)

Catalyst preparation: The procedure of example 1 is followed, except no complexing agent is taken in the preparation during the preparation of the catalyst at room temperature (34° C.). The resulting white solid formed was washed with DI water to remove all the un-complexed ions and dried overnight (12 h) at 70° C. under the vacuum and as described in example 1. The resulting catalyst was designated as DMC-18.

PXRD analysis of DMC-18 showed two major signals of 2θ values at 17.4° and 24.6°.

Elemental analysis of the solid DMC catalyst showed: Zn=18.0 wt %; Fe=9.2 wt %.

Comparative Example 19: Zinc Hexacyanocobaltate without any Complexing Agent (DMC-15)

Catalyst Preparation: The procedure of example 8 is followed, except no complexing agent is taken in the preparation of the catalyst at room temperature (8° C.). The resulting white solid formed was washed with DI water to remove all the un-complexed ions and dried overnight (10 h) at 70° C. under the vacuum and as described in example 9. The resulting catalyst was designated as DMC-19. PXRD analysis of DMC-19 showed two major signals of 2θ values at 16.9° and 20.8°. Elemental analysis of the solid DMC catalyst showed: Zn=24.5 wt %; Co=11.8 wt %.

TABLE 1

Metal Composition of Zn—Fe, Mn—Fe, Ni—Fe-based DMC catalysts

| Catalyst | Elemental composition (%) | |
|---|---|---|
| | Zn | Fe |
| DMC-1 | 35.6 | 17.3 |
| DMC-2 | 33.3 | 16.5 |
| DMC-3 | 22.3 | 11.3 |
| DMC-4 | 23.2 | 13.2 |
| DMC-5 | 15.5 | 5.4 |
| DMC-6 | 21.4 | 6.6 |
| DMC-7 | 20.7 | 2.6 |
| | Mn | Fe |
| DMC-14 | 5.8 | 0.7 |
| | Ni | Fe |
| DMC-15 | 7.1 | 1.2 |
| | Zn | Fe |
| DMC-18 | 18.0 | 9.2 |

TABLE 2

Metal Composition of Zn—Co, Mn—Co and Ni—Co-based DMC catalysts

| Catalyst | Elemental composition (%) | |
|---|---|---|
| | Zn | Co |
| DMC-8 | 32.3 | 16.5 |
| DMC-9 | 24.1 | 11.4 |
| DMC-10 | 22.5 | 6.1 |
| DMC-11 | 18.0 | 3.5 |
| DMC-12 | 24.8 | 11.9 |
| DMC-13 | 24.0 | 11.4 |
| | Mn | Co |
| DMC-16 | 12.3 | 0.9 |
| | Ni | Co |
| DMC-17 | 10.2 | 1.7 |
| | Zn | Co |
| DMC-19 | 24.5 | 11.8 |

Catalysts Characterized by PXRD and Brunauer-Emmett-Teller (BET) Isotherm

The catalysts made without any complexing agent (EDTA/t-BuOH/PEPO) resemble the pattern of highly crystalline zinc hexacyanoferrate/zinchexacyanocobaltate (FIG. 1). These catalysts (DMC-18, DMC-19) showed poor activity (less yield) for epoxide polymerization. The catalysts of the invention (DMC-1 to DMC-13) made using EDTA as a complexing agent showed high activity to produce PEPO with major signals at 16.9°, 18.0°, 20.8°, and 23.6° for DMC-2 to DMC-4, DMC-6, DMC-7 as well as at 15.1°, 12.5°, 19.6°, and 24.0° for DMC-9 to DMC-13 catalysts, indicating that the catalysts are substantially amorphous complex which produced various viscosity ranges (9-87063 mm$^2$/s) PEPO with maximum yield (98%). The results are mentioned in tables 4, 5, 6, and 7. The Zn and Fe-based DMC-4 catalyst and Zn and Co-based DMC-9 catalyst actively polymerize the PO using various initiators and therefore are optimized to check the effect of various reaction parameters such as catalyst amount, reaction time, temperature, and pressure (Table 5, 6, and 7). However, the effect of the organic complexing agent in the DMC catalyst is disclosed in table 4.

TABLE 3

PXRD and BET analysis DMC Catalyst Characterization

| Catalyst | X-Ray Diffraction Pattern (Å) | | | | BET Surface area (m$^2$/g) |
|---|---|---|---|---|---|
| DMC-2 | 16.9 | 18.0 | 23.6 | 24.5 | 20.3 |
| DMC-3 | 16.9 | 18.0 | 23.6 | 27.3 | 9.8 |
| DMC-4 | 16.9 | 18.0 | 23.6 | 27.3 | 9.9 |
| DMC-6 | 16.9 | 20.8 | 26.2 | 28.2 | 13.8 |
| DMC-7 | 16.9 | 20.8 | 23.6 | 24.5 | 16.4 |
| DMC-9 | 15.1 | 17.4 | 24.6 | 35.0 | 770.9 |
| DMC-10 | 12.5 | 19.6 | 24.0 | 30.2 | 723.9 |
| DMC-11 | 12.5 | 19.6 | 24.0 | 30.2 | 673.9 |
| DMC-12 | 12.5 | 19.6 | 24.0 | 30.2 | 639.1 |
| DMC-13 | 15.1 | 17.4 | 24.6 | 35.0 | 616.0 |
| DMC-14 | 16.9 | 20.8 | 23.6 | 24.5 | — |
| DMC-15 | 15.1 | 17.4 | 24.6 | 35.0 | — |

Example 20: Synthesis of PEPO-1: EG as an Initiator Using DMC-1 as a Catalyst

The Teflon lined reactor was charged with 8.31 g of EG, 32.6 g of PO, and 0.3 g of DMC-1 catalyst. In this reaction, EG was used as an initiator. The autoclave was then purged with nitrogen at 0-0.5 bar for 5 min to remove dissolved gases and to create an inert atmosphere. The mixture was then heated and stirred until the reactor temperature reached 105° C. and pressurized with $N_2$ to 5 bar. Then reaction temperature with stirring was maintained at 105° C. for 24 h for the polymerization. The reactor pressure was raised to >11 bar then gradually decreased with the reaction progress (time), showing the conversion of PO to PEPO. The reaction was cooled down to room temperature (28° C.). A viscous liquid was obtained as a product after the reaction. The PEPO was then filtered at room temperature (28° C.) and dried under vacuum at 70° C. This PEPO was designated as PEPO-1, and the kinematic viscosity of the produced PEPO-1 was mentioned in table 4.

The effect of the organic complexing agent in the DMC catalyst during the polymerization reaction has been shown in table 4. DMC-4 was further optimized to check the effect of other reaction parameters (Catalyst amount, reaction time, temperature, and pressure) for epoxide polymerization. Therefore, the catalyst amount was varied from 0.05-0.3 g, temperature from Room temperature (RT) to 150° C., and the pressure from 1-20 bar to check their effects on ROP of PO, and results are shown in tables 4, 5 and 6.

Example 21: DMC-2 as a Catalyst and EG as an Initiator for PEPO-2 Synthesis

The procedure of example 16 was used, except DMC-2 was used as a catalyst. A viscous liquid was obtained as a product after the reaction. The PEPO was then filtered at room temperature (25° C.) and dried under vacuum at 70° C., and designated as PEPO-2. The kinematic viscosity and yield of PEPO-2 have been shown in table 4.

Example 22: DMC-3 as a Catalyst and EG as an Initiator for PEPO-3 Synthesis

The procedure of example 16 was used, except DMC-3 was used as a catalyst. A viscous liquid PEPO was obtained as a product after the reaction. The PEPO was then filtered at room temperature (25° C.) and dried under vacuum at 70° C., and designated as PEPO-3. The kinematic viscosity and yield have been shown in table 4.

Example 23: DMC-4 as a Catalyst and EG as an Initiator for PEPO-4 Synthesis

The procedure of example 16 was used, except in that DMC-4 is used as a catalyst. A viscous liquid PEPO was obtained as a product after the reaction. The PEPO was then filtered at room temperature (26° C.) and dried under vacuum at 70° C., and designated as PEPO-4. The kinematic viscosity and yield have been shown in table 4.

Example 24: DMC-5 as a Catalyst and EG as an Initiator for PEPO-5 Synthesis

The procedure of example 16 was used except in that DMC-5 is used as a catalyst. A viscous liquid PEPO was obtained as a product after the reaction. The PEPO was then filtered at room temperature (28° C.) and dried under vacuum at 70° C., and designated as PEPO-5. The kinematic viscosity and yield have been shown in table 4.

Example 25: DMC-6 as a Catalyst and EG as an Initiator for PEPO-6 Synthesis

The procedure of example 16 was used except in that DMC-6 is used as a catalyst. A viscous liquid PEPO was obtained as a product after the reaction. The PEPO was then filtered at room temperature (23° C.) and dried under vacuum at 70° C., and designated as PEPO-6. The kinematic viscosity and yield have been shown in table 4.

Example 26: DMC-7 as a Catalyst and EG as an Initiator for PEPO-7 Synthesis

The procedure of example 16 was used, except DMC-7 was used as a catalyst. The PEPO, which has been used as a co-complexing agent, of the synthesized DMC-7 catalyst is 1000 $M_w$. A viscous liquid PEPO was obtained as a product after the reaction. The PEPO was then filtered at room temperature (31° C.) and dried under vacuum at 70° C., and designated as PEPO-7. The kinematic viscosity and yield have been shown in table 4.

TABLE 4

Yield and kinematic viscosity of the PEPO (PEPO-1 to PEPO-13)

| PEPO | Catalyst | $ZnCl_2:K_3[Fe(CN)_6]$ | PO:EG | Amount (g) | Temp. (° C.) | Press (Bar) | Time (h) | Yield (%) | Viscosity ($mm^2/s$) @40° C. |
|---|---|---|---|---|---|---|---|---|---|
| PEPO-1 | DMC-1 | 44:1 | 2:1 | 0.3 | 105 | 5 | 24 | 91.5 | 23.52 |
| PEPO-2 | DMC-2 | 44:1 | 2:1 | 0.3 | 105 | 5 | 24 | 95.8 | 26.43 |
| PEPO-3 | DMC-3 | 44:1 | 2:1 | 0.3 | 105 | 5 | 24 | 96.2 | 27.39 |
| PEPO-4 | DMC-4 | 44:1 | 2:1 | 0.3 | 105 | 5 | 24 | 98.0 | 28.91 |
| PEPO-5 | DMC-5 | 44:1 | 2:1 | 0.3 | 105 | 5 | 24 | 97.5 | 28.25 |
| PEPO-6 | DMC-6 | 44:1 | 2:1 | 0.3 | 105 | 5 | 24 | 96.9 | 30.30 |
| PEPO-7 | DMC-7 | 44:1 | 2:1 | 0.3 | 105 | 5 | 24 | 77.0 | 12.93 |
| PEPO-8 | DMC-8 | 44:1 | 2:1 | 0.3 | 105 | 5 | 24 | 47.5 | 18.25 |
| PEPO-9 | DMC-9 | 44:1 | 2:1 | 0.3 | 105 | 5 | 24 | 68.1 | 26.33 |
| PEPO-10 | DMC-10 | 44:1 | 2:1 | 0.3 | 105 | 5 | 24 | 54.2 | 21.55 |
| PEPO-11 | DMC-11 | 44:1 | 2:1 | 0.3 | 105 | 5 | 24 | 51.3 | 18.99 |
| PEPO-12 | DMC-12 | 44:1 | 2:1 | 0.3 | 105 | 5 | 24 | 39.7 | 15.15 |
| PEPO-13 | DMC-13 | 44:1 | 2:1 | 0.3 | 105 | 5 | 24 | 67.8 | 9.56 |
| PEPO-14 | DMC-14 | 44:1 | 2:1 | 0.3 | 105 | 5 | 24 | 49.3 | 20.6 |
| PEPO-15 | DMC-15 | 44:1 | 2:1 | 0.3 | 105 | 5 | 24 | 25.3 | 11.3 |
| PEPO-16 | DMC-16 | 44:1 | 2:1 | 0.3 | 105 | 5 | 24 | 59.1 | 25.8 |
| PEPO-17 | DMC-17 | 44:1 | 2:1 | 0.3 | 105 | 5 | 24 | 51.8 | 22.2 |
| PEPO-18 | DMC-18 | 44:1 | 2:1 | 0.3 | 105 | 2.5 | 24 | 67.3 | 18.4 |

| PEPO | Catalyst | $ZnCl_2:K_3[Co(CN)_6]$ | PO:EG | Amount (g) | Temp. (° C.) | Press (Bar) | Time (h) | Yield (%) | Viscosity ($mm^2/s$) @40° C. |
|---|---|---|---|---|---|---|---|---|---|
| PEPO-19 | DMC-19 | 44:1 | 2:1 | 0.3 | 105 | 2.5 | 24 | 42.8 | 15.6 |

The effect of the amount of catalyst, time, temperature, and PO:EG ratio on the production of PEPO using zinc hexacyanoferrate (DMC-4) as a catalyst and EG as an initiator is shown in table 5 (PEPO-20 to PEPO-33).

TABLE 5

Effect of catalyst amount, time, temperature, pressure, and PO:EG ratio on the production of PEPO (Catalyst = DMC-4, Initiator = EG)

| PEPO | $ZnCl_2:K_3[Fe(CN)_6]$ | PO:EG | Amount (g) | Temp. (° C.) | Press (Bar) | Time (h) | Yield (%) | Viscosity ($mm^2/s$) @40° C. |
|---|---|---|---|---|---|---|---|---|
| PEPO-20 | 44:1 | 2:1 | 0.3 | 105 | 1 | 24 | 81.1 | 20.15 |
| PEPO-21 | 44:1 | 2:1 | 0.3 | 105 | 2.5 | 24 | 83.5 | 22.09 |
| PEPO-22 | 44:1 | 2:1 | 0.3 | 105 | 5 | 24 | 98.7 | 24.81 |

TABLE 5-continued

Effect of catalyst amount, time, temperature, pressure, and PO:EG ratio on the production of PEPO (Catalyst = DMC-4, Initiator = EG)

| PEPO | ZnCl$_2$:K$_3$[Fe(CN)$_6$] | PO:EG | Amount (g) | Temp. (° C.) | Press (Bar) | Time (h) | Yield (%) | Viscosity (mm$^2$/s) @40° C. |
|---|---|---|---|---|---|---|---|---|
| PEPO-23 | 44:1 | 2:1 | 0.3 | 105 | 10 | 24 | 98.9 | 26.86 |
| PEPO-24 | 44:1 | 2:1 | 0.3 | 105 | 20 | 24 | 98.5 | 28.94 |
| PEPO-25 | 44:1 | 2:1 | 0.3 | 130 | 5 | 24 | 96.9 | 25.24 |
| PEPO-26 | 44:1 | 2:1 | 0.3 | 140 | 5 | 24 | 98.9 | 26.38 |
| PEPO-27 | 44:1 | 2:1 | 0.3 | 150 | 5 | 24 | 99.5 | 26.69 |
| PEPO-28 | 44:1 | 2:1 | 0.2 | 105 | 5 | 24 | 64.6 | 14.35 |
| PEPO-29 | 44:1 | 2:1 | 0.1 | 105 | 5 | 24 | 51.4 | 21.17 |
| PEPO-30 | 44:1 | 11:1 | 0.1 | 105 | 5 | 24 | 71.1 | 72.06 |
| PEPO-31 | 44:1 | 22:1 | 0.1 | 105 | 5 | 24 | 98.7 | 175.36 |
| PEPO-32 | 44:1 | 22:1 | 0.1 | 105 | 5 | 36 | 98.2 | 259.29 |
| PEPO-33 | 44:1 | 22:1 | 0.05 | 105 | 5 | 24 | 21.4 | 22.84 |

Example 27: Synthesis of PEPO-8: EG as an Initiator Using DMC-8 as a Catalyst The Teflon autoclave was charged with 8.31 g of EG, 32.6 g of PO, and 0.3 g of DMC-8. In this reaction, EG was used as an initiator. The autoclave was then purged with nitrogen at 0-0.5 bar for 5 min to remove dissolved gases and to create an inert atmosphere. The mixture was then heated and stirred until reactor temperature reached 105° C. and pressurized with N$_2$ to 5 bar, and then it was kept for heating with stirring at 105° C. for 24 h for the polymerization. The autoclave was cooled down to room temperature to terminate copolymerization with time, and the reactor pressure was raised to >11 bar then gradually decreased with the reaction progress (time), showing the conversion of PO to PEPO. A viscous liquid was obtained as a product after the reaction. The reaction was cooled down to room temperature (29° C.). The PEPO was then filtered at room temperature (29° C.) and dried under vacuum at 70° C. This polyol was designated as PEPO-8, and the kinematic viscosity of the PEPO-8 is mentioned in table 4.

The effect of the amount of catalyst and PO:EG ratio during the polymerization reaction has been shown in table 6. The catalyst amount has been varied from 0.3-0.05 g. (PEPO-34 to PEPO-36) and PO:EG ratio was varied from 2:1 to 22:1 (PEPO-34 to PEPO-38).

Example 28: DMC-9 as a Catalyst and EG as an Initiator for the Synthesis of PEPO-9

The procedure of example 27 was used, except DMC-9 was used as a catalyst. A viscous liquid PEPO was obtained as a product after the reaction. The PEPO was then filtered at room temperature (22° C.) and dried under vacuum at 70° C., and designated as PEPO-9. The kinematic viscosity and yield of the PEPO-9 obtained are shown in table 4.

Example 29: DMC-10 as a Catalyst and EG as an Initiator for the Synthesis of PEPO-10

The procedure of example 27 was used, except DMC-10 was used as a catalyst. A viscous liquid PEPO was obtained as a product after the reaction. The PEPO was then filtered at room temperature (22° C.) and dried under vacuum at 70° C., and designated as PEPO-10. The kinematic viscosity and yield of the PEPO-10 obtained are shown in table 4.

Example 30: DMC-11 as a Catalyst and EG as an Initiator for the Synthesis of PEPO-11

The procedure of example 27 was used, except DMC-11 was used as a catalyst. A viscous liquid was obtained as a product after the reaction. The PEPO was then filtered at room temperature (20° C.) and dried under vacuum at 70° C., and designated as PEPO-11. The kinematic viscosity and yield of the PEPO-11 obtained are shown in table 4.

Example 31: DMC-12 as a Catalyst and EG as an Initiator for the Synthesis of PEPO-12

The procedure of example 27 was used, except DMC-12 was used as a catalyst. A viscous liquid was obtained as a product after the reaction. The PEPO was then filtered at room temperature (15° C.) and dried under vacuum at 70° C., and designated as PEPO-12. The kinematic viscosity and yield of the PEPO-12 obtained are shown in table 4.

Example 32: DMC-13 as a Catalyst and EG as an Initiator for the Synthesis of PEPO-13

The procedure of example 27 was used, except DMC-13 was used as a catalyst. The PEPO, which has been used as a co-complexing agent, of the synthesized DMC-13 catalyst, was of ≈1000 M$_w$. A viscous liquid PEPO was obtained as a product after the reaction. The PEPO was then filtered at room temperature (25° C.) and dried under vacuum at 70° C., and designated as PEPO-13. The kinematic viscosity and yield of the PEPO-13 obtained are shown in table 4.

Example 33: DMC-14 as a Catalyst and EG as an Initiator for the Synthesis of PEPO-14

The procedure of example 16 was used, except DMC-14 was used as a catalyst. A viscous liquid was obtained as a product after the reaction. The PEPO was then filtered at room temperature (16° C.) and dried under vacuum at 70° C., and designated as PEPO-14. The kinematic viscosity and yield of the PEPO-14 obtained are shown in table 4.

Example 34: DMC-15 as a Catalyst and EG as an Initiator for the Synthesis of PEPO-15

The procedure of example 16 was used, except DMC-15 was used as a catalyst. A viscous liquid was obtained as a product after the reaction. The PEPO was then filtered at room temperature (19° C.) and dried under vacuum at 70° C., and designated as PEPO-15. The kinematic viscosity and yield of the PEPO-15 obtained are shown in table 4.

Example 35: DMC-16 as a Catalyst and EG as an Initiator for the Synthesis of PEPO-16

The procedure of example 27 was used, except DMC-16 was used as a catalyst. A viscous liquid was obtained as a product after the reaction. The PEPO was then filtered at room temperature (13° C.) and dried under vacuum at 70° C., and designated as PEPO-16. The kinematic viscosity and yield of the PEPO-16 obtained are shown in table 4.

Example 36: DMC-17 as a Catalyst and EG as an Initiator for the Synthesis of PEPO-17

The procedure of example 27 was used, except DMC-17 was used as a catalyst. A viscous liquid was obtained as a product after the reaction. The PEPO was then filtered at room temperature (18° C.) and dried under vacuum at 70° C., and designated as PEPO-17. The kinematic viscosity and yield of the PEPO-17 obtained are shown in table 4.

Comparative Example 37: DMC-18 as a Catalyst and EG as an Initiator for the Synthesis of PEPO-18

The procedure of example 16 was used, except DMC-18 was used as a catalyst. A viscous liquid PEPO was obtained as a product after the reaction. The PEPO was then filtered at room temperature (19° C.) and dried under vacuum at 70° C., and designated as PEPO-18. The kinematic viscosity and yield of PEPO-18 are shown in table 4.

Comparative Example 38: DMC-19 as a Catalyst and EG as an Initiator for the Synthesis of PEPO-19

The procedure of example 27 was used, except DMC-19 was used as a catalyst. A viscous liquid PEPO was obtained as a product after the reaction. The PEPO was then filtered at room temperature (21° C.) and dried under vacuum at 70° C., and designated as PEPO-19. The kinematic viscosity and yield of PEPO-19 are shown in table 4.

TABLE 6

Effect of catalyst amount and PO:EG ratio on the production of PEPO (Catalyst = DMC-9, Initiator = EG)

| PEPO | $ZnCl_2:K_3[Co(CN)_6]$ | PO:EG | Amount (g) | Temp. (° C.) | Press (Bar) | Time (h) | Yield (%) | Viscosity ($mm^2/s$) @ 40° C. |
|---|---|---|---|---|---|---|---|---|
| PEPO-34 | 44:1 | 2:1 | 0.3 | 105 | 5 | 24 | 68.1 | 26.33 |
| PEPO-35 | 44:1 | 22:1 | 0.1 | 105 | 5 | 24 | 22.1 | 19.57 |
| PEPO-36 | 44:1 | 22:1 | 0.05 | 105 | 5 | 24 | 11.0 | Insufficient yields to conduct viscosity experiments |

Example 39: Effect of Initiator on the Production of PEPO

Synthesis of PEPO: DPG (134.17 $M_w$) as an Initiator Using DMC-9 as a Catalyst The Teflon autoclave was charged with 3.35 g of DPG, 32.3 g of PO, and 0.1 g of DMC-9. The autoclave was then purged with nitrogen at 0-0.5 bar for 5 min to remove dissolved gases and to create an inert atmosphere. The mixture was then heated and stirred until reactor temperature reached 105° C. and pressurized with $N_2$ to 5 bar, and then it was kept for heating with stirring at 105° C. for 24 h for the polymerization. The autoclave was cooled down to room temperature to terminate copolymerization with time, and the reactor pressure was raised to >11 bar then gradually decreased with the reaction progress (time), showing the conversion of PO to PEPO. A viscous liquid was obtained as a product after the reaction. The reaction was cooled down to room temperature (21° C.). The PEPO was then filtered at room temperature (21° C.) and dried under vacuum at 70° C.

The effect of the catalyst amount and time during the polymerization reaction using DMC-9 catalyst has been shown in table 7. The catalyst amount has been varied from 0.05 to 0.1 g and time from 8 to 24 h and is shown in table 7. The yield and kinematic viscosity of the PEPO (PEPO-37 to PEPO-42) obtained are shown in table 7. Also, the effect of the ratio of metal salt to metal cyanide salt (1:1 to 50:1) in DMC catalyst for the production of PEPO has also been disclosed in table 8 (PEPO-50 to PEPO-53).

TABLE 7

Effect of catalyst amount, temperature, and time on the production of PEPO (Catalyst = DMC-9, Initiator = DPG)

| PEPO | ZnCl$_2$:K$_3$[Co(CN)$_6$] | PO:DPG | Catalyst amount (g) | Temp. (° C.) | Press (B) | Time (h) | Yield (%) | Viscosity (mm$^2$/s) @ 40° C. |
|---|---|---|---|---|---|---|---|---|
| PEPO-37 | 44:1 | 2:1 | 0.1 | RT | 5 | 24 | 12.26 | Insufficient yields to conduct viscosity experiments |
| PEPO-38 | 44:1 | 22:1 | 0.1 | 105 | 5 | 24 | 98.2 | 302.84 |
| PEPO-39 | 44:1 | 22:1 | 0.05 | 105 | 5 | 24 | 91.1 | 647.73 |
| PEPO-40 | 44:1 | 22:1 | 0.05 | 105 | 5 | 12 | 76.3 | 175.85 |
| PEPO-41 | 44:1 | 22:1 | 0.05 | 105 | 5 | 8 | 28.8 | 40.70 |
| PEPO-42 | 44:1 | 22:1 | 0.05 | 105 | 5 | 4 | 19.6 | 26.78 |

Example 40: PEG-2000 (2000 M$_w$) as an Initiator

Synthesis of PEPO: PEG-2000 as an Initiator (DMC-9 as a Catalyst)

The procedure of example 39 was used, except PEG-2000 was used as an initiator instead of DPG. The catalyst used in this reaction was DMC-9 at 0.05-0.007 g level. A viscous liquid PEPO was obtained as a product after the reaction. The PEPO was then filtered at room temperature (16° C.) and dried under vacuum at 70° C. The effect of the catalyst amount and reaction time using PEG-2000 as an initiator during the polymerization reaction to produce PEPO (PEPO-43 to PEPO-47) is shown in table 8.

Example 41: Glycerol (92.09 M$_w$) as an Initiator (DMC-9 as a Catalyst)

The procedure of example 39 was used, except glycerol was used as an initiator instead of DPG. The catalyst used in this reaction was DMC-9 at 0.05 g level. A viscous liquid PEPO was obtained as a product after the reaction. The PEPO was then filtered at room temperature (18° C.) and dried under vacuum at 70° C., and designated as PEPO-48. The yield and kinematic viscosity of the PEPO-48 obtained are shown in table 8.

Example 42: NPG (104.14 M$_w$) as an Initiator (DMC-9 as a Catalyst)

The procedure of example 39 was used, except NPG was used as an initiator instead of DPG. The catalyst used in this reaction was DMC-9 at 0.05 g level. A viscous liquid PEPO was obtained as a product after the reaction. The PEPO was then filtered at room temperature (14° C.) and dried under vacuum at 70° C., and designated as PEPO-49. The yield and kinematic viscosity of the PEPO-49 obtained are shown in table 8.

Example 43:1, 4-BD (88.15 M$_w$) as an Initiator (DMC-9 as a Catalyst)

The procedure of example 39 was used except 1, 4-BD was used as an initiator instead of DPG. The catalyst used in this reaction was DMC-9 at 0.05 g level. A viscous liquid PEPO was obtained as a product after the reaction. The PEPO was then filtered at room temperature (13° C.) and dried under vacuum at 70° C., and designated as PEPO-50. The yield and kinematic viscosity of the PEPO-50 obtained are shown in table 8.

Example 44: EO/PO Copolymer Diol (3200 M$_w$) as an Initiator (DMC-4 as a Catalyst) for PEPO-50 Synthesis The procedure of example 16 was used, except EO/PO copolymer diol of 3200 M$_w$ was used as an initiator instead of EG. The catalyst used in this reaction was DMC-4 at 0.1 g level. A viscous liquid PEPO was obtained as a product after the reaction. The PEPO was then filtered at room temperature (23° C.) and dried under vacuum at 70° C., and designated as PEPO-50. The yield and kinematic viscosity of the PEPO-50 obtained are shown in table 10.

TABLE 8

Effect of catalyst amount, time, initiators, and metal salt to metal cyanide ratios in DMC catalyst on the production of PEPO (Catalyst = DMC-9, Initiators = PEG-2000, Glycerol, NPG, 1,4-BD)

| PEPO | ZnCl$_2$:K$_3$[Co(CN)$_6$] | PO:PEG-2000 | Catalyst amount (g) | Temp. (° C.) | Press (B) | Time (h) | Yield (%) | Viscosity (mm$^2$/s) @ 40° C. |
|---|---|---|---|---|---|---|---|---|
| PEPO-43 | 44:1 | 1100:1 | 0.05 | 105 | 5 | 1 | 97.2 | High Viscosity (Thick waxy product) |
| PEPO-44 | 44:1 | 1100:1 | 0.015 | 105 | 5 | 1 | 6.5 | Insufficient yields to conduct viscosity experiments |

TABLE 8-continued

Effect of catalyst amount, time, initiators, and metal salt to metal cyanide ratios in DMC catalyst on the production of PEPO (Catalyst = DMC-9, Initiators = PEG-2000, Glycerol, NPG, 1,4-BD)

| PEPO-45 | 44:1 | 1100:1 | 0.007 | 105 | 5 | 1 | 4.8 | Insufficient yields to conduct viscosity experiments |
|---|---|---|---|---|---|---|---|---|
| PEPO-46 | 44:1 | 1100:1 | 0.015 | 105 | 5 | 18 | 96.3 | 87063 |
| PEPO-47 | 44:1 | 1100:1 | 0.007 | 105 | 5 | 18 | 30.3 | Insufficient yields to conduct viscosity experiments |

| PEPO | $ZnCl_2$:$K_3[Co(CN)_6]$ | PO:Glycerol | Catalyst amount (g) | Temp. (° C.) | Press (B) | Time (h) | Yield (%) | Viscosity ($mm^2/s$) @ 40° C.C. |
|---|---|---|---|---|---|---|---|---|
| PEPO-48 | 44:1 | 22:1 | 0.05 | 105 | 5 | 24 | 26.9 | 12.34 |

| PEPO | $ZnCl_2$:$K_3[Co(CN)_6]$ | PO:NPG | Catalyst amount (g) | Temp. (° C.) | Press (B) | Time (h) | Yield (%) | Viscosity ($mm^2/s$) @ 40° C. |
|---|---|---|---|---|---|---|---|---|
| PEPO-49 | 44:1 | 22:1 | 0.05 | 105 | 5 | 24 | 28.5 | 53.14 |

| PEPO | $ZnCl_2$:$K_3[Co(CN)_6]$ | PO:1,4-BD | Catalyst amount (g) | Temp. (° C.) | Press (B) | Time (h) | Yield (%) | Viscosity ($mm^2/s$) @ 40° C. |
|---|---|---|---|---|---|---|---|---|
| PEPO-50 | 44:1 | 22:1 | 0.05 | 105 | 5 | 24 | 55.2 | 79.6 |

| PEPO | $ZnCl_2$:$K_3[Co(CN)_6]$ | PO:1,4-BD | Catalyst amount (g) | Temp. (° C.) | Press (B) | Time (h) | Yield (%) | Viscosity ($mm^2/s$) @ 40° C. |
|---|---|---|---|---|---|---|---|---|
| PEPO-51 | 50:1 | 22:1 | 0.05 | 105 | 5 | 24 | 56.2 | 75.8 |

| PEPO | $ZnCl_2$:$K_3[Co(CN)_6]$ | PO:1,4-BD | Catalyst amount (g) | Temp. (° C.) | Press (B) | Time (h) | Yield (%) | Viscosity ($mm^2/s$) @ 40° C. |
|---|---|---|---|---|---|---|---|---|
| PEPO-52 | 20:1 | 22:1 | 0.05 | 105 | 5 | 24 | 42.8 | 68.6 |

| PEPO | $ZnCl_2$:$K_3[Co(CN)_6]$ | PO:1,4-BD | Catalyst amount (g) | Temp. (° C.) | Press (B) | Time (h) | Yield (%) | Viscosity ($mm^2/s$) @ 40° C. |
|---|---|---|---|---|---|---|---|---|
| PEPO-53 | 1:1 | 22:1 | 0.05 | 105 | 5 | 24 | 31.2 | 58.2 |

TABLE 9

Effect of the different initiator (EO/PO copolymer diol) on the production of PEPO

| PEPO | Catalyst | $ZnCl_2$:$K_3[Fe(CN)_6]$ | PO:EO/PO copolymer diol | Amount (g) | Temp. (° C.) | Press (Bar) | Time (h) | Yield (%) | Viscosity ($mm^2/s$) @ 40° C. |
|---|---|---|---|---|---|---|---|---|---|
| PEPO-54 | DMC-4 | 44:1 | 2200:1 | 0.1 | 105 | 5 | 18 | 86.8 | High Viscosity (Thick waxy product) |

Advantages of the Invention

Synthesis of zinc-iron and zinc-cobalt based DMC catalysts using EDTA as a novel organic complexing agent at room temperature (8 to 40° C.) for the synthesis of PEPO.

A single step process for the production of PEPO using synthesized DMC catalysts to check their activity on ROP of PO.

Use of different initiators such as ethylene glycol (EG), 1,4-butane diol (1,4-BD), dipropylene glycol (DPG), neopentyl glycol (NPG), glycerol, polyethylene glycol (PEG)-2000, EO/PO copolymer diol for enhancing PEPO yield.

Use of DMC catalyst at a lower dosage for ROP of PO for which its removal from PEPO products was eliminated/minimized.

The invention claimed is:

1. A double metal cyanide [DMC] catalyst comprising:
   (a) 25 to 75 wt % double metal cyanide [DMC] complex;
   (b) 25 to 74 wt % an organic complexing agent; and optionally
   (c) 1 to 10 wt % co-complexing agent;
   based on the combined weight of the DMC complex, the organic complexing agent, and the co-complexing agent, when present;
   wherein said organic complexing agent is selected from ethylenediaminetetraacetic acid (EDTA), EDTA alkali metal salt, or a mixture thereof; and
   wherein said optional co-complexing agent used is selected from tertiary butanol (t-BuOH), a polyether polyol (PEPO), or a combination thereof.

2. The catalyst according to claim 1, wherein DMC complex is selected from the group consisting of zinc(II) hexacyanocobaltate(III), zinc(II)hexacyanoferrate(II), zinc(II)hexacyanoferrate(III), cobalt(II) hexacyanoferrate(III), manganese(II) hexacyanoferrate(III), nickel(II) hexacyanoferrate(III), manganese(II) hexacyanocobaltate(III) and nickel(II) hexacyanocobaltate.

3. The catalyst according to claim 1, wherein DMC catalyst is selected from the group consisting of:
   (i) Zinc hexacyanoferrate-EDTA catalyst (DMC-1);
   (ii) Zinc hexacyanoferrate-EDTA catalyst (DMC-2);
   (iii) Zinc hexacyanoferrate-EDTA catalyst (DMC-3);
   (iv) Zinc hexacyanoferrate-EDTA catalyst (DMC-4);
   (v) Zinc hexacyanoferrate-EDTA catalyst (DMC-5);
   (vi) Zinc hexacyanoferrate-EDTA-t-BuOH catalyst (DMC-6);
   (vii) Zinc hexacyanoferrate-EDTA-PEPO catalyst (DMC-7);
   (viii) Zinc hexacyanocobaltate-EDTA catalyst (DMC-8);
   (ix) Zinc hexacyanocobaltate-EDTA catalyst (DMC-9);
   (x) Zinc hexacyanocobaltate-EDTA catalyst (DMC-10);
   (xi) Zinc hexacyanocobaltate-EDTA catalyst (DMC-11);
   (xii) Zinc hexacyanocobaltate-EDTA-t-BuOH catalyst (DMC-12);
   (xiii) Zinc hexacyanocobaltate-EDTA-PEPO catalyst (DMC-13).

4. A process for the synthesis of DMC catalyst according to claim 1 comprising the steps of:
   (a) reacting an aqueous solution of metal salts of formula $M(B)_n$ and metal cyanide salt of formula $(A)_xM'(CN)_y$;
   wherein M is selected from the group consisting of Zn(II), Fe(II), Pb(II), Mo(IV), Al(III), Mn(II), V(IV), V(V), W(IV), W(VI), Co(II), Sn(II), Cu(II), Cr(III), Ni(II);
   B is an anion selected from the group consisting of halides, sulfates, hydroxides, cyanides, oxalates, isocyanates, thiocyanates, isothiocyanates, carboxylates, and nitrates;
   n is selected from 1 to 3, which satisfies the valency of M;
   A is selected from an alkali metal ion or alkaline earth metal ion;
   M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V);
   Both x and y are integers greater than or equal to 1, and the sum of the charges of x and y balances the charge of M';
   in a molar ratio ranging between 1:1 to 50:1 in the presence of an organic complexing agent and co-complexing agent to obtain a reaction slurry;
   (b) mixing the slurry as obtained in step (a) with polyethylene glycol (PEG) with the number average molecular weight ranging from 200 to 400 $M_w$ and a solvent and homogenizing this mixture for a period in the range of 1 to 10 min, followed by one time centrifugation to obtain a solid cake; and
   (c) adding the aqueous solutions of PEG ($M_w$=200 to 400), and a solvent to the solid cake obtained in step (b) at room temperature in the range of 8 to 40° C. for a period in the range of 5 to 30 min followed by precipitation, centrifugation, and vacuum drying for a period in the range of 8-12 h to attain the DMC catalyst.

5. The process according to claim 4, wherein solvent used in step (b) and (c) is selected from tetrahydrofuran [THF] or Acetonitrile [ACN].

6. A process for ring opening polymerization (ROP) of propylene oxide with initiators to produce PEPO having a molecular weight between 200 to 1000 $M_w$ using the catalyst according to claim 1 comprising the steps of:
   (a) taking 375 ppm to 7500 ppm DMC catalyst, initiator, and propylene oxide (PO) in a Teflon lined reactor and running the ROP reaction at a temperature in the range of 8 to 150° C. and pressure in the range of 1 bar to 20 bar for a time period in the range of 1 to 24 h to obtain a mixture;
   (b) cooling down the reactor to room temperature in the range of 8 to 39° C. after completion of reaction; and
   (c) separating unreacted PO from produced PEPO followed by vacuum drying at a temperature in the range of 40° C. to 70° C. to obtain 80 to 98.7% PEPO;
   wherein the DMC catalyst ppm value is based on the combined amounts of initiator and propylene oxide.

7. The process according to claim 6, wherein propylene oxide and initiator molar ratio is ranging between 2:1 to 2200:1.

8. The process according to claim 7, wherein initiator used is selected from the group consisting of Ethylene glycol, 1,4-butane diol, dipropylene glycol, neopentyl glycol, glycerol, polyethylene glycol (PEG)-2000, or ethylene oxide/propylene oxide (EO/PO) copolymer diol.

* * * * *